United States Patent [19]
Zykan

[11] Patent Number: 5,806,020
[45] Date of Patent: Sep. 8, 1998

[54] LASER BASED SPEED AND ACCIDENT RECONSTRUCTION MEASURING APPARATUS AND METHOD

[75] Inventor: Blair J. Zykan, Englewood, Colo.

[73] Assignee: Laser Technology, Inc., Englewood, Colo.

[21] Appl. No.: 843,577

[22] Filed: Apr. 16, 1997

Related U.S. Application Data

[63] Continuation-in-part of Ser. No. 520,651, Aug. 29, 1995, Pat. No. 5,696,705.

[51] Int. Cl.$^6$ ............................................. G01S 1/08
[52] U.S. Cl. ......................... 702/159; 702/151; 702/155; 702/157; 356/3.03; 701/223; 701/300; 701/301; 250/201.6; 342/451; 342/458
[58] Field of Search .................................... 364/550, 552, 364/559, 561, 565; 356/5.01, 5.05, 152.1, 376, 375, 139.03, 141.3, 141.5, 3.03, 3.09, 3.12, 3.14, 3.16, 399, 4.01, 4.08; 33/293; 367/127.99, 118; 702/159, 152; 701/300; 250/201.6; 342/451, 458

[56] References Cited

U.S. PATENT DOCUMENTS

| | | | |
|---|---|---|---|
| 4,730,190 | 3/1988 | Win et al. | 342/118 |
| 4,805,086 | 2/1989 | Nielsen et al. | 364/167.05 |
| 5,221,956 | 6/1993 | Patterson et al. | 356/28 |
| 5,337,149 | 8/1994 | Kozah et al. | 356/376 |
| 5,361,217 | 11/1994 | Makimura et al. | 702/152 |
| 5,537,201 | 7/1996 | Kumagai et al. | 356/4.08 |
| 5,696,705 | 12/1997 | Zykan | 702/159 |

OTHER PUBLICATIONS

"Making a point about safer highways." Laser Technology, Inc. brochure, Aug. 1993 Laser Technology, Inc., Englewood, Colorado.

M.A. Davis, "Traffic—Laser: A New Tool for Accident Investigators", *Law and Order*, Jan. 1992, Hendon, Inc., Wilmette, Illinois.

W.A. Kennedy and G.L. Stephens, "Test of Laser Speed Detection System", *Accident Reconstruction Journal*, Jan./Feb. 1992, Waldorf, Maryland.

M.A. Davis, "Traffic—Measuring With A Laser", *Law and Order*, Feb. 1994, Hendon, Inc., Wilmette, Illinois.

M. Bradshaw and B. Zykan, "Improving Data Acquisition and Conversion Productivity Using Laser Mapping Systems", Mar. 14, 1994, AM/FM International Conference, Denver, Colorado.

*Primary Examiner*—Emanuel Todd Voeltz
*Assistant Examiner*—Cuong H. Nguyen
*Attorney, Agent, or Firm*—John R. Wahl; William J. Kubida; Holland & Hart LLP

[57] ABSTRACT

An apparatus is disclosed for determining, in a first speed mode of operation, speed and range of a moving object and, in a second survey mode of operation, determining direct distances to an object and automatically calculate horizontal and vertical component distances to the object. Also disclosed is a system and method for data entry and retroactive reconstruction of the relative position of features and objects, in particular with respect to scenes such as transitory occurrences, utilizing a signal transmitting and receiving speed, distance and tilt angle determining apparatus or device. In a particular embodiment, the apparatus disclosed has especial applicability to tactical situation use by law enforcement personnel and the system and method in the on-scene recordation and subsequent ex post facto reconstruction of crime and traffic accident scenes by law enforcement officers. The system and method may be readily and efficiently implemented in conjunction with a laser-based speed, distance and tilt angle determining device otherwise usable for vehicle speed traffic monitoring functions utilizing either triangulation or baseline/offset mensuration techniques.

52 Claims, 5 Drawing Sheets

LASER BASED SPEED AND ACCIDENT RECONSTRUCTION MEASURING APPARATUS AND METHOD

CROSS REFERENCE TO RELATED APPLICATIONS

This application is a continuation in part application of Ser. No. 520,651, filed Aug. 29, 1995 now U.S. Pat. No. 5,696,705, issued Dec. 9, 1997.

BACKGROUND OF THE INVENTION

1. Field of the Invention

This invention generally relates to hand held laser speed measurement devices used by traffic law enforcement personnel and more particularly to a hand held laser based apparatus for measuring speed, distance and angular displacement which can be used to monitor vehicle speed, provide on-scene feature location and coordinate recordation for tactical operations and subsequent ex post facto planar diagrammatic reconstruction of traffic accident scenes, and correct such diagrams for elevation variations and three dimensional reconstructions.

2. Description of the Related Art

Transitory events, such as accident scenes in particular, must be accurately and quickly recorded in situ prior to the removal of the affected vehicles and the like for purposes of later reconstructing the relative position of various features and objects and their relationship to fixed positions at the site. The data collected is then utilized to establish the final position of the vehicles and associated debris as well as to provide information from which reasonable inferences might be drawn concerning the events leading up to the accident.

Because, by their very nature, vehicular accidents almost always occur on or adjacent to roadways, the conventional methods of accurately recording the data necessary to accurately establish relative vehicle positions with respect to fixed adjacent objects (such as road signs, telephone poles and the like) manually, utilizing a measuring wheel or roll-a-tape, clipboard and pencil, require that the accident scene not be disturbed for an extended period of time prior to clearing. During this laborious investigation process, other vehicular traffic is either slowed or totally obstructed which can itself lead to secondary incidents or accidents involving other vehicles or individuals assisting at the scene. Over and above the increased danger to the investigating officer and other motorists, the economic impact of the closure of a single lane of traffic on a three-lane roadway is estimated to be on the order of $5000 for each twenty (20) minutes the lane remains closed.

As a result of the aforementioned dangers and concomitant economic factors, it is vitally important that the investigating officer record and then clear an accident scene as rapidly as possible. Nevertheless, the data recorded must be accurate and verifiable for later use in reconstructing the incident. Formal procedures must be followed such that the integrity of the data gathered might be ensured. Two methods of determining distances regarding an accident scene have been generally employed utilizing a mechanical distance measuring device like a roll-a-tape combined with the manual recordation of the distances on a clipboard.

The "baseline" (or "baseline/offset") method is one recordation technique in which an imaginary grid or coordinate system is established overlying the accident scene with a first axis fixed between two permanent objects or positions adjacent the site (such as traffic signs, utility poles and the like) which are utilized as control points. The investigating officer must then manually measure a series of distances along the first axis to establish various positions (e.g. the abscissa), at which positions he must then additionally walk off and make a like series of right angle measurements to vehicle tires, skid marks and the like to establish the coordinate along the second axis (e.g. the ordinate). The resulting "x,y" values can then be utilized to reconstruct the accident scene on a grid for subsequent investigation.

An alternative technique is the "triangulation" (or "range/triangulation") method. In practice, this technique requires that a pair of fixed object or position control points also be selected and the distance between them established by manual measurement. The officer then positions himself adjacent the various points of interest (such as the first vehicle's left front tire, the second vehicle's right front tire and the like) and then walks off and measures the distance to both of the control points for each point of interest. The resultant data can then be utilized to calculate the x,y position of the various points with respect to the control points by knowledge of the lengths of the three sides of the triangle formed. However, due to the relative difficulty most officers have in computing the coordinates, this final step is seldom undertaken.

In practice, the baseline technique is the most time consuming to implement in the field but the most expeditious to reconstruct back at the police station. The converse is true of the triangulation method. However, regardless of the technique employed, current roll-a-tape, clipboard and pencil techniques are time consuming as well as subject to measurement errors when obstructions are in the path of the measurement to be made and recordation errors which might not be detected until after the accident has been cleared. Moreover, during the entire process, the normal traffic flow at the scene is disrupted and the investigating officer is exposed to the attendant dangers of making the measurements for an extended period of time.

Although requiring a high degree of training and experience not generally known to the attending officer, conventional surveying techniques might also be utilized to record the features of an accident scene. In this regard, a survey specialist and accompanying rod-man must be brought to the scene with their equipment to then establish survey measurements at the site. This technique further slows the recordation of the accident features prior to clearing of the scene and is more time consuming and labor intensive in its implementation.

Most importantly, these manual methods of accident reconstruction used by officers fail to account for the elevational configurations of the site. Often an accident occurs in a hilly area or one or more of the vehicles is found on an embankment or in a ditch that is a substantially different elevation from that of the roadway. Currently there is no convenient way to reconstruct the scene or accurately describe the topography of the accident scene without elaborate surveying technicians being brought to the site. This again takes substantial time and delays the clearing of the site which results in prolonged traffic congestion.

SUMMARY OF THE INVENTION

Disclosed herein is a hand held apparatus that provides, in one instrument, the capability of accurately measuring speed, distance and tilt angle in order to accurately measure speed in one mode of operation, and, in a second mode of operation, measure direct distances to objects and automatically compute horizontal distances and elevations and provide the necessary data for accurate two and three dimensional reconstruction of a scene such as a vehicular accident scene on any topography. Also disclosed is a system and method for data entry and retroactive two dimensional and three dimensional reconstruction of scenes, especially transitory occurrences such as vehicle accidents. The apparatus includes a laser-based speed and distance determining device which incorporates a laser transmitter and receiver and a tilt angle sensor in a single housing to accurately generate horizontal and vertical component distances of a direct distance measurement and which produces data necessary to produce a reconstructed accident scene taking into account variations in land and object elevations.

The apparatus in accordance with a preferred embodiment of the present invention incorporates a conventional tilt sensor and appropriate computational electronics into a commercially available laser based speed and ranging instrument such as the LTI 20/20 Marksman device designed and manufactured by Laser Technology, Inc. 7070 S. Tucson Way, Englewood, Colo. 80112, assignee of the present invention. Certain aspects of the Marksman device are disclosed in U.S. Pat. No. 5,359,404 for "Laser-Based Speed Measuring Device" issued to Laser Technology, Inc., the disclosure of which is herein specifically incorporated by this reference. The Marksman device is one already in extensive use by law enforcement agencies worldwide for speed limit enforcement due to its ease of use, portability and extremely accurate and rapid measurement of vehicle speed by determining the time of flight of a series of laser pulses transmitted to a target and reflected back from the target to the instrument.

The apparatus of the present invention incorporates preferably a liquid damped tilt angle sensor and a horizontal distance and elevational calculation computer whose output is sequentially fed through a serial output port in addition to an in-sight, head-up display of target speed. Target speed and range is sensed and calculated in a first mode of operation of the apparatus. Direct range to the target, elevation of the target, and horizontal range to the target are calculated in a second, distance measuring mode of operation of the apparatus. Corresponding data signals for each of the above mentioned parameters can be directly transferred via the serial port to a field data collector/recorder such as the Hewlett-Packard model HP48GX. This data recorder's computational capability may be specifically programmed to facilitate implementation of the system and method of the present invention by means of a flash programmable read-only memory ("PROM") card and the data recorder itself may be physically and removably attached to the exterior of the device in addition to its electrical coupling for data entry and collection.

Specifically disclosed is a range/triangulation method for determining the first and second horizontal coordinates as well as relative elevations of at least one of a plurality of positions of various features or objects with respect to first and second control points established adjacent thereto. The method comprises the steps of initially determining a first direct distance between the first and second control points (which may be accomplished utilizing a signal transmitting and receiving distance measuring device to produce and receive a first transmitted and first received signal respectively between the control points and measuring the time of flight therebetween and sensing and storing a signal representative of a first tilt angle for the first transmitted signal) and then positioning the distance measuring device at one of the plurality of positions. Preferably, the first measurement, between control points, is made with the transceiver horizontal so that the tilt angle is zero. However, this is not actually necessary as the horizontal component is automatically calculated by the device.

A second transmitted signal is then directed toward the first control point, producing a second reflected signal which is received from the first control point back at the distance measuring device for the second transmitted signal. The second distance between that one of the plurality of positions and the first control point is based on a time of flight of the second transmitted and second reflected signals. A second tilt angle is also sensed at the time of second signal transmission. A third transmitted signal is then directed toward the second control point to produce a third reflected signal from the second control point at the distance measuring device along with a third tilt angle for the third transmitted signal. A third distance between that same one of the plurality of positions and the second control point is then determined based on a time of flight of the third transmitted and third reflected signals. Alternatively, the second and third distances may be determined by positioning the distance measuring device at the first and second control points and then directing the transmitted signals towards a feature or object occupying the same one of the plurality of positions to be determined. The horizontal distances corresponding to the second and third distances are automatically calculated from the second and third distances and the second and third tilt angles.

Alternatively a baseline position method may be used for determining the first and second horizontal coordinates of a feature or object occupying one of a plurality of positions with respect to a baseline extending between first and second control points fixed adjacent the feature or object. The method comprises the steps of positioning a signal transmitting and receiving speed, distance and tilt angle measuring device at one of a plurality of points along the baseline perpendicular to that specific one of the plurality of positions. A first transmitted signal is directed toward the first control point producing a first reflected signal from the first control point which is received at the distance measuring device. A first distance and tilt angle between that point on the baseline and the first control point is then determined based on a time of flight of the first transmitted and first reflected signals and the sensed first tilt angle. A second transmitted signal is then also directed toward the object at that specific one of the plurality of positions and a second reflected signal is received from the object back at the distance measuring device along with a second tilt angle. A second distance between the object and that position on the baseline is determined based on a time of flight of the second transmitted and second reflected signals and the second sensed tilt angle thereby establishing the horizontal coordinates of the feature and the relative elevation of the feature.

Further disclosed is a system for recording relative positional data points of a scene comprising a signal transmitting and receiving speed, distance and tilt angle measuring device having a user aiming sight for directing a transmitted signal toward each in a series of selected objects or features and receiving a reflected signal and tilt angle therefrom. The speed, distance and tilt angle measuring device is capable of determining a direct distance and a horizontal distance to each of the series of selected objects or features based upon a time of flight of the transmitted signals directed to each one of the series of selected objects or features and reflected signals received from each one of the series of selected objects or features and the sensed tilt angle of the distance measuring device sensed during each signal transmission.

The apparatus in accordance with the invention may be operated in two modes: speed mode and survey mode. In the speed mode of operation, the apparatus determines speed and range of the target only. In the survey mode, the apparatus determines direct distances and, using the tilt sensor, also determines horizontal distances and relative elevations to the target.

The apparatus preferably incorporates a display viewable by the user. A data recorder/collector is also preferably associated with the speed, distance and tilt angle measuring apparatus and has a data input section for manual actuation by the user. The data recorder may be directly or remotely coupled to the speed, distance and tilt angle measuring apparatus. The data recorder receives, in the survey mode of operation, the direct distance and tilt angle information as well as the calculated horizontal distance and vertical elevation information, stores this data indicative of a plurality of the direct, horizontal and vertical distances to each of the selected objects or features as well as tilt angle parameters, calculates coordinates and may display selected ones of the distances and coordinates on a display.

Each of the measured direct distances and its associated tilt angle and/or horizontal and vertical component data stored may be associated with a user selected identifier code or mnemonic input to the data input section of the data recorder. Since the horizontal target distance and the vertical elevation of the target are automatically calculated by the computational circuitry in the apparatus and then downloaded to the data recorder, the data recorder then can calculate two dimensional and three dimensional coordinates for each measurement taken and can be used to generate planar and elevational representations of the data as well as mapping three dimensional representations of the data.

The tilt angles may also be used internally by the apparatus to display, upon user demand, the actual direct distance to the target object, the horizontal distance to the target object, the tilt angle of the measurement, and the elevational distances of the target objects from the plane of the transceiver. The data strings downloaded to the data recorder may also be processed by a PC or other computer to generate various additional perspective three dimensional views of the scene being or having been previously mapped.

The laser based speed, distance and tilt angle measuring apparatus in accordance with the present invention may also be advantageously utilized by law enforcement personnel in tactical situations where it is convenient and helpful to determine horizontal and vertical distances as well as direct distances to a targeted object. Such situations may include rescue situations where immediately available height or depth information would be helpful in ordering the proper amount and type of rescue equipment to the scene, or in hostage taking situations and other situations requiring SWAT team participation, the apparatus can provide accurate target range information to the personnel first on the scene.

BRIEF DESCRIPTION OF THE DRAWINGS

The aforementioned and other features and objects of the present invention and the manner of attaining them will become more apparent and the invention itself will be best understood by reference to the following description of a preferred embodiment, taken in conjunction with the accompanying drawings, wherein.

DESCRIPTION OF A PREFERRED EMBODIMENT

Figure 1:
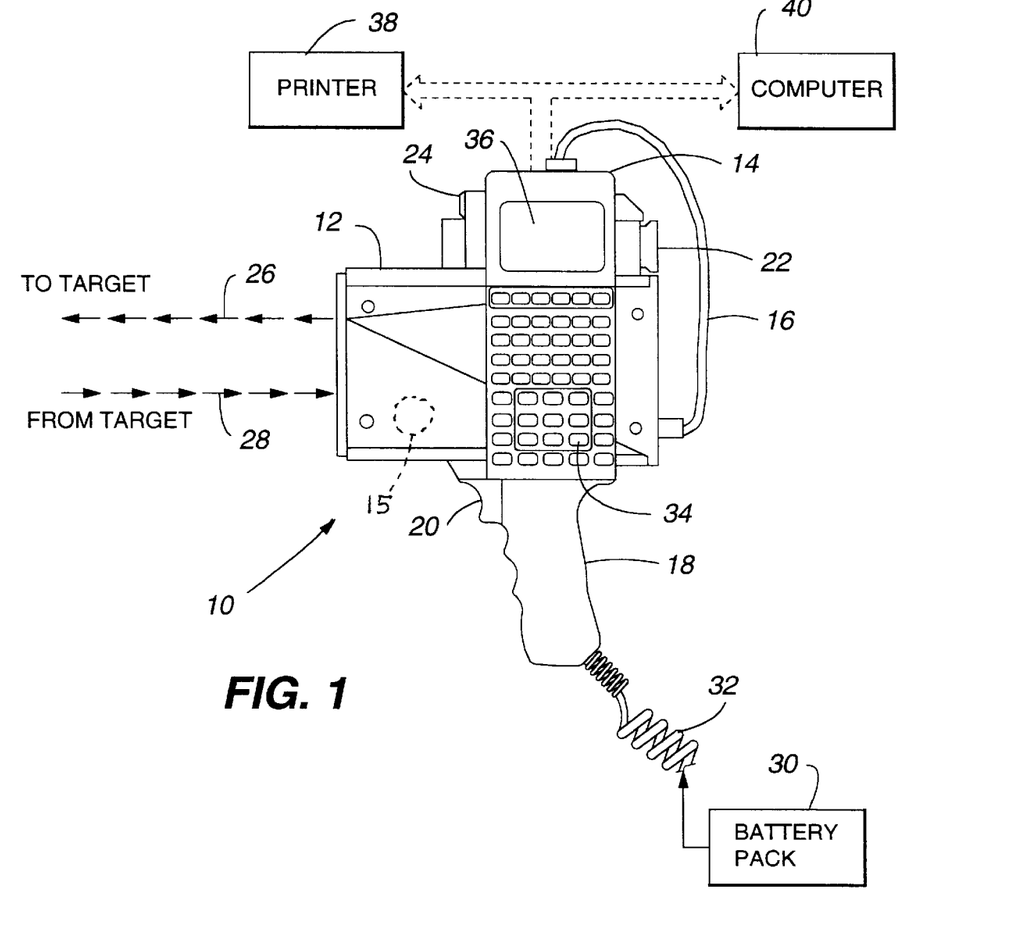
FIG. 1 is a side elevational view of a particular embodiment of a system in accordance with the present invention comprising a hand-held laser speed, ranging, and tilt angle instrument incorporating a head-up display aiming sight (or other sighting device) physically and electrically coupled to a field data collection device and further illustrating the capability of downloading information gathered by the laser speed, tilt and ranging instrument and stored in the data collection device to an associated printer or computer.

With reference now to FIG. 1, a system 10 for data entry and retroactive reconstruction of the relative position of features and object utilizing a signal transmitting and receiving speed, distance and tilt angle determining apparatus or device 12 is shown. The system comprises, in pertinent part, a speed, distance and tilt angle determining device 12 preferably electrically and physically coupled to a data recorder 14. In the particular embodiment illustrated, the speed, distance and tilt angle measuring device 12 comprises a modified laser based speed and ranging instrument such as the LTI 20/20 Marksman J laser based speed and ranging instrument designed and manufactured by Laser Technology, Inc., 7070 South Tucson Way, Englewood, Colo., assignee of the present invention. The modified device 12 incorporates in its housing a damped fluid tilt angle sensor 15 that senses inclination of the device 12 from a horizontal neutral position due to gravity. The tilt angle sensor 15 produces an electrical signal proportional to the inclination of the device from the neutral horizontal position. A presently preferred tilt angle sensor is an ISU Inclinometer manufactured by the Macklanburg-Duncan Company of Oklahoma City, Okla. The data recorder 14 as illustrated may comprise a Hewlett Packard Model HP48GX field data collector. The modified Marksman speed, distance and tilt angle measuring device 12 incorporates a serial port which may be utilized to directly couple the speed, distance and tilt angle measuring device 12 to the data recorder 14 by means of a data cable 16. In this manner, speed, distance and tilt angle measurements made utilizing the speed, distance and tilt angle measuring device 12 may be input directly to the data recorder 14 without manual entry.

As shown, the speed, distance and tilt angle measuring device 12 incorporates a pistol grip 18 attached to the housing of the device 12 for manual retention by a user and to enable aiming of the speed, distance and tilt angle measuring device 12 toward a moving vehicle in the speed mode of operation or, in the survey mode of operation, at a number of stationary features and objects, for example, at an accident or tactical event scene. A trigger 20 is squeezed by the user in order to initiate the speed and distance measurement functionality of the speed, distance and tilt angle measuring device 12 in both the speed and the survey mode. In other implementations of the system 10, an activation device or switch other than the trigger 20 may be employed.

In the preferred embodiment illustrated, an aiming scope 22 incorporating an insight head-up display 24 allows a user to place a reticle on a feature or object, the speed and/or distance of which is to be determined, and view the speed and/or distance measurement within the head-up display 24 simultaneously with the inputting of digital data representative of that distance via the data cable 16 directly to the data recorder 14 in the survey mode. Alternatively, a simple sighting device for visually acquiring a desired feature may be employed instead of the head-up display 24.

In the survey mode, upon squeezing the trigger 20, a transmitted signal 26 comprising a series of laser pulses is directed toward the feature or object upon which the reticle has been visually placed by the user. The transmitted signal 26 is then reflected back from the feature or object comprising the target, producing a reflected signal 28 which is received by the distance and tilt angle measuring device 12. The tilt angle of the device 12 is sensed during laser signal transmission and stored internally. The direct distance to the target, the horizontal distance to the target, i.e. the horizontal component, and the elevation, i.e. the vertical component, are then calculated internally based upon the time of flight of the laser pulses of the transmitted and reflected signals 26, 28 and the tilt angle. These distance and angle values may be sequentially viewed on the display 24 after a measurement is taken by the user repetitively pressing a button to step through the onboard memory locations.

The speed, distance and tilt angle measuring device 12 receives power from a portable battery pack 30 via a power cord 32 or optionally from an internal battery pack. The data recorder 14 also includes a manually actuatable keypad 34 for inputting data to the data recorder 14 in addition to that which is input thereto directly from the speed, distance and tilt angle measuring device 12 via the data cable 16. The data recorder 14 includes a visual display 36 indicative of various range and other alpha-numeric information pre-programmed therein, or directly or manually input to the data recorder 14 through use at a given site. The data recorder 14 may optionally be remotely located, for example, in a vehicle or on the ground and may be larger or smaller than that shown in FIG. 1. Alternatively, the data recorder may be miniaturized further and actually built into the housing of the device 12.

The system 10 may also be directly coupled to a printer 38 for printout of information input to, and collected by, the data recorder 14 when in operation. In a particular application, the printer 38 may comprise a small portable infrared printer to allow a user of the system 10 to print out a "hard copy" of the information gathered directly at the scene of the features and objects being recorded. Additionally, the data retained within the data recorder 14 collected at a scene may be downloaded to a computer 40 as an ASCII text file for database storage or word processing use or may be converted to drawing exchange format ("DXF") or similar format for use in conjunction with computer aided design ("CAD") or geographical information system ("GIS") packages. In conjunction with the latter software, the information may be directly utilized to produce computer generated maps of the scene indicative of the relative position of the features and objects recorded in operation of the system 10.

Figure 2:
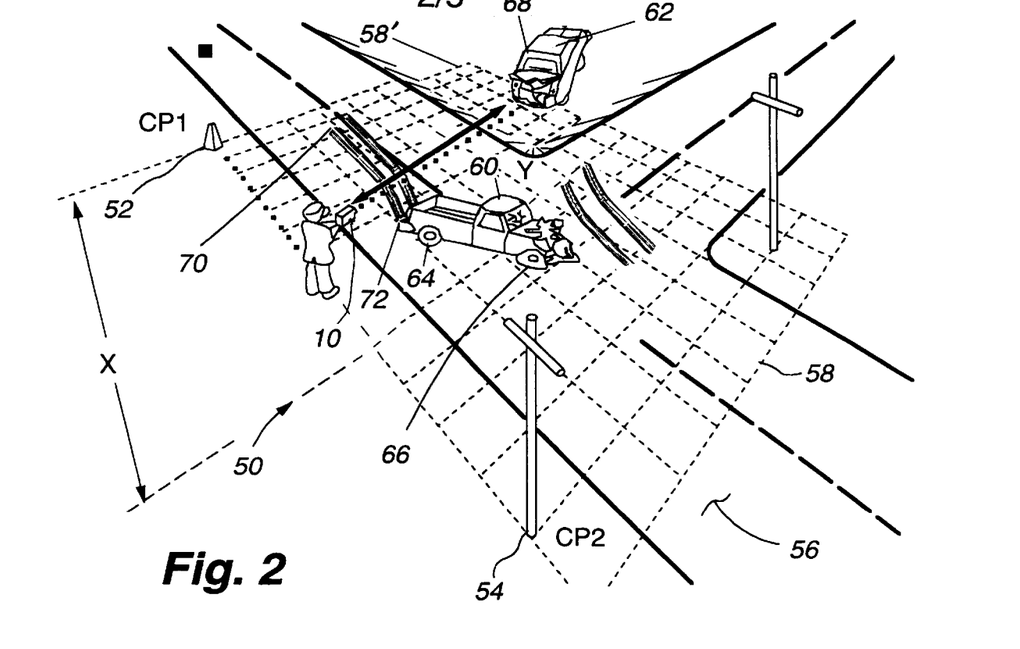
FIG. 2 is a perspective view illustrative of the possible use of the system of FIG. 1 at the scene of a vehicle accident to make baseline determinations of the position of various portions of the vehicles involved and other features with respect to distances measured at right angles to a baseline position established between two fixed control points ("CP1", "CP2") at a distance ("dc") to determine the x,y coordinates and relative "z" elevations of various features in accordance with one method of the present invention.

With reference additionally now to FIG. 2, a baseline/offset position method 50 for determining the relative position of features and objects at a scene is shown utilizing the system 10 of FIG. 1. The baseline position method 50 comprises the steps of initially determining a pair of control points such as control point 52 ("CP1") and control point 54 ("CP2"). In the exemplary illustration depicted, control point 52 may comprise a fixed object or added feature (such as a traffic cone placed at a known position to reflect the incident laser beam) in conjunction with a control point 54 comprising a fixed scene feature such as a utility pole. An imaginary horizontal line extending between control point 52 to control point 54 then comprises a horizontal baseline as a reference for determining the coordinates of various features and objects at the scene. Alternatively, the CP1 control point 52 may be used in conjunction with a horizontal, predetermined angle to define the horizontal baseline reference.

In the representative illustration shown, the scene comprises a vehicular accident which has occurred on a roadway 56 which may or may not be level, but in this case has an adjacent ditch into which one of the vehicles has fallen. Prior to clearing the accident scene, the relative position of various features and objects representative of the vehicle positions, the initiation of skids and various objects which may have been ejected from the vehicles are accurately determined for later law enforcement and liability determination purposes. Utilizing the baseline position method 50 shown, an imaginary horizontal grid 58 is overlain upon the accident scene and the x,y coordinate positions of the various features and objects determined within the grid 58. In this exemplary illustration, the scene includes an accident between a first vehicle 60 and a second vehicle 62. The second vehicle 62 is off the road 56 and down in a ditch at a lower elevation as shown by the grid 58'. To accurately reconstruct the scene after the accident has been cleared, the relative position of various features and objects of the accident scene must be accurately determined such as the position of the right rear tire 64 and right front tire 66 of the first vehicle 60 as well as the right rear tire 68 of the second vehicle 62. Other information relative to the accident scene may include the skid mark inception point 70 and skid mark end point 72 of the first vehicle 60.

In order to accurately determine the horizontal coordinates of, for example, the right rear tire 68 of the second vehicle 62, which is down in the ditch, the user of the system 10 would first position himself along the baseline extending between the control points 52, 54 to a position perpendicular to that of the right rear tire 68. The user would then aim the system 10 toward the control point 52 to determine the distance therefrom and the system 10 will automatically store the actual distance and the tilt angle of the measuring device, calculate the horizontal distance to the control point 52, and enter that horizontal distance as the value of the x coordinate of the object being sighted if the control point 52 is initially determined to have x,y coordinates of "0,0". Alternatively, the user may manually enter the horizontal distance displayed in the head-up display 24 of the aiming scope by means of the keypad 34 (FIG. 1).

The user then would turn 90 degrees from the baseline and aim the system 10 toward the right rear tire 68 to determine the distance to the feature or object from the baseline extending between the control points 52, 54, either automatically storing that distance and tilt angle and automatically calculating the corresponding horizontal distance or manually entering the displayed horizontal distance as the y coordinate and optionally manually entering the elevational distance, if appropriate, as the z coordinate. This latter situation might be used, for example, if there is an obstruction between the user and the object which would preclude the taking of direct to target measurements. Whether the feature is to the left or right of the baseline is also entered by the user in response to a prompt on the visual display 36 and that information is utilized to automatically compute a corresponding "+" or "−" value. By repeating this procedure as will be more fully described hereinafter in conjunction with the manual input of feature descriptors to the keypad 34 (FIG. 1) of the system 10, data is then entered into the system 10 and is retained thereby in order to accurately reconstruct the accident scene at a later time.

Figure 3:
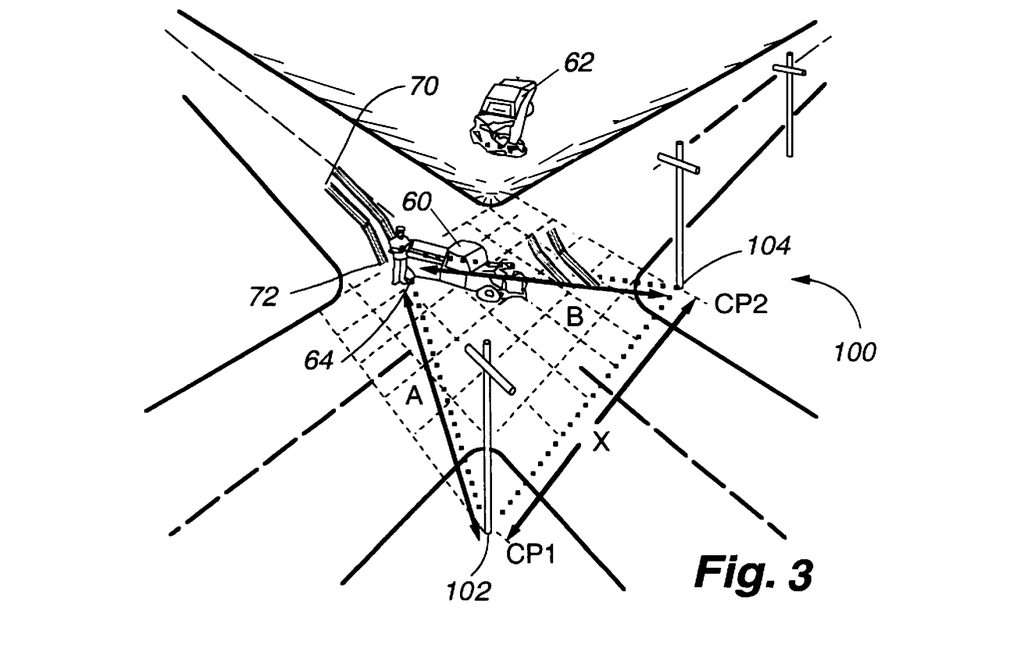
FIG. 3 is a further perspective view illustrative of still another possible use of the system of FIG. 1 at the same accident scene to make triangulation based determinations of the position of various portions of the vehicles involved and other features with respect to distances ("A","B") measured to two fixed control points ("CP1", "CP2") at a known distance apart ("Z") in accordance with another method of the present invention which is then used to calculate the horizontal x,y coordinates and elevations of such features.

With reference additionally now to FIG. 3, a range/triangulation method 100 for utilizing the system 10 is shown which method comprises an alternative technique for recording and facilitating the later reconstruction of information regarding the relative position of various features and objects at a scene. Utilizing prior techniques such as roll-a-tape, clipboard and pencil, the baseline position method 50 is the more difficult method to utilize at an accident scene although results in the easiest computation of the direct x,y coordinates of various features and objects inasmuch as they are recorded directly. On the other hand, there is no direct way to calculate the actual horizontal x,y coordinates in the prior art manual system unless precise surveying equipment is used. Also, the prior use of the same manual system to effectuate a range/triangulation determination of relative positions of various features and objects has proven to be the simpler technique to use at an accident site yet it requires more intense trigonometric calculation to derive the direct coordinates of the various features and objects, if the latter step is even undertaken due to its relative difficulty. In addition, there has been no way to account for terrain elevational variations such as the vehicle 62 being in a ditch as in FIG. 3 without the use of sophisticated surveying equipment. However, utilizing the range/triangulation method 100 in conjunction with the system 10, the horizontal x,y coordinates are directly computed for the user by the system 10 thereby allowing a quicker recordation and more accurate determination and recordation of distances to various features and objects at a scene without having to manually compute the x,y coordinates from the imprecise range measurements taken.

The range/triangulation method 100 illustrated preferably begins by again establishing a pair of control points, in this case control point 102 and control point 104, comprising, for example, two fixed objects adjacent the scene to be recorded such as the pair of utility poles illustrated. The distance between the control points 102, 104 may be directly entered if a known value, or may be determined by standing at, for example, the control point 102 and aiming the system 10 toward the control point 104 to determine the distance therebetween. The distance between the control points 102, 104 then determines, for example, the value of the variable "X". Once the distance between the control points 102, 104 is determined in conjunction with the definition of their respective horizontal x,y coordinates, the user of the system 10 may then position himself adjacent a desired feature (such as that of the right rear tire 64 of the first vehicle 60) and take a pair of measurements from that position to the two control points 102, 104 thus determining two distances "A" and "B" and their respective tilt angles. Utilizing the values of "A", "B", and "X", and their respective tilt angles (with the initial coordinates of the control points 102, 104) the x,y,z coordinates of the feature or object such as the right rear tire 64 may be automatically calculated by the apparatus 12 and corresponding data transmitted to the recorder 14. Alternatively, the user of the system 10 may determine the distances "A" and "B" and their respective tilt angles by standing at the control points 102, 104 and measuring these distances and tilt angles by aiming the system 10 toward the right rear tire 64. Again, the user is prompted to enter whether the feature is to the left or right of the line extending between the two control points 102, 104 to allow for automatic calculation of a "+" or "−" value.

Figure 4A:
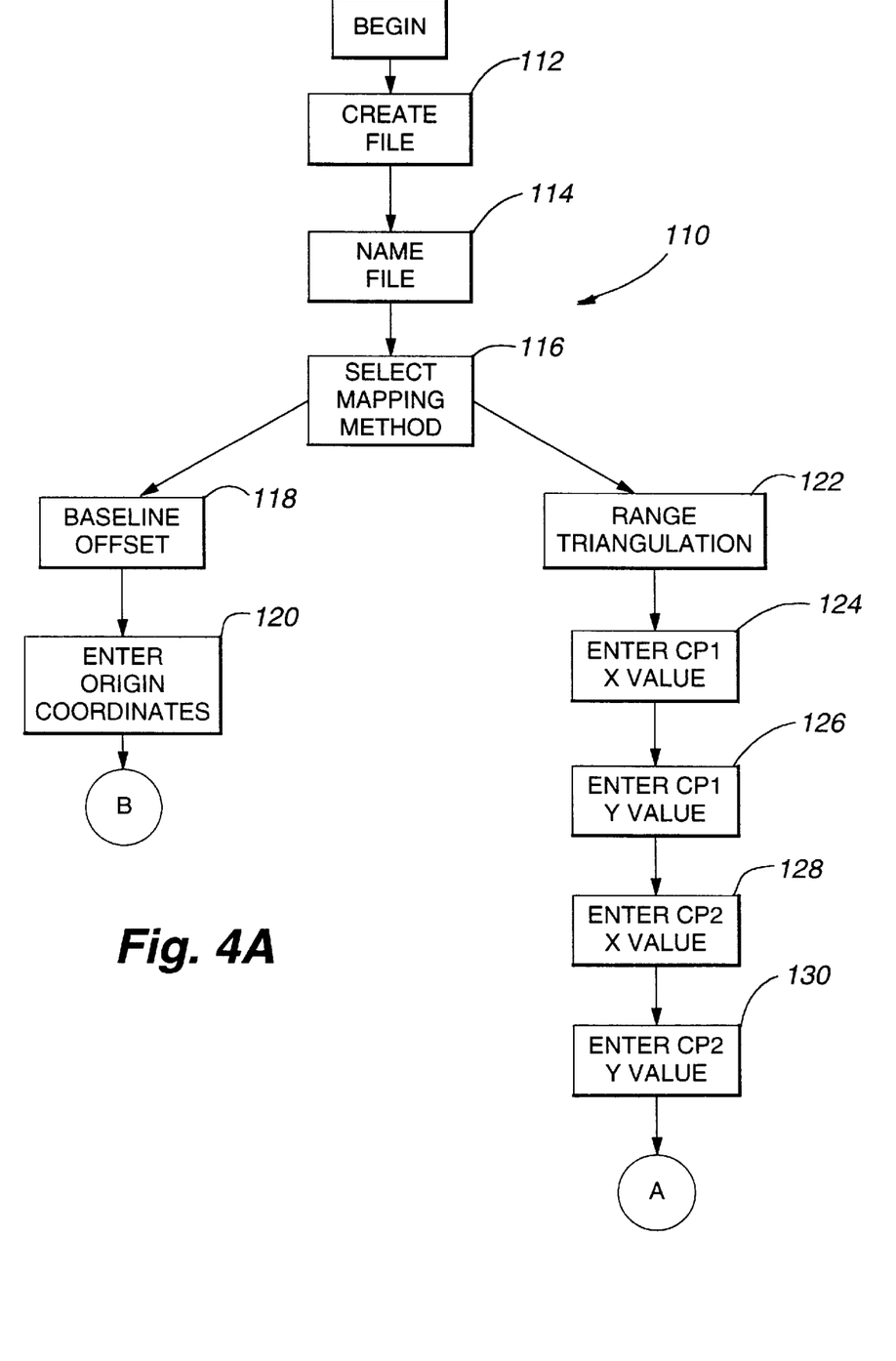
FIGS. 4A–4C are representative flow charts depicting the alternative baseline/offset and range/triangulation processes as illustrated in FIGS. 2 and 3 respectively in accordance with the methods of the present invention utilizing the system shown in FIG. 1.
Figure 4B:
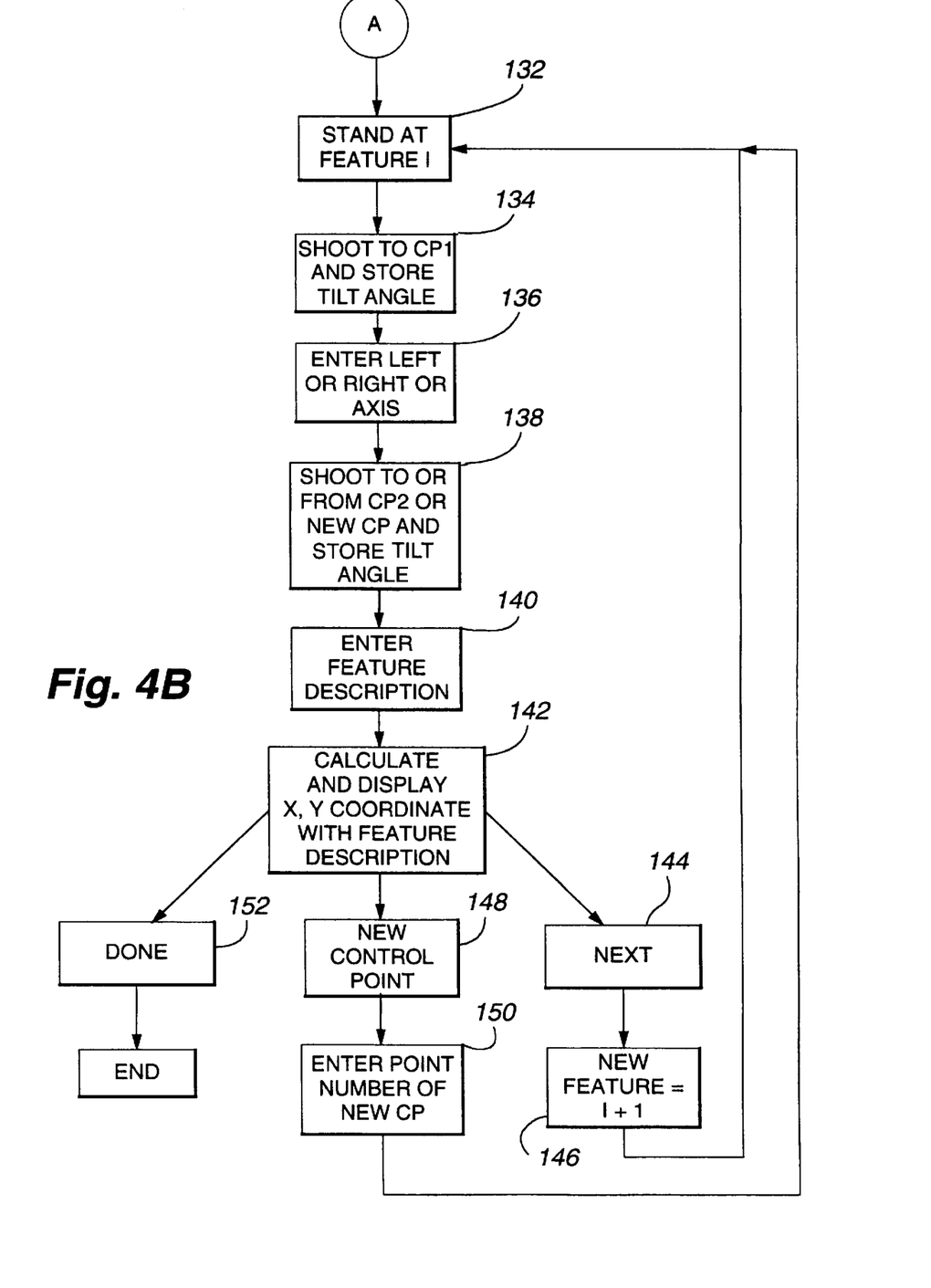
Figure 4C:
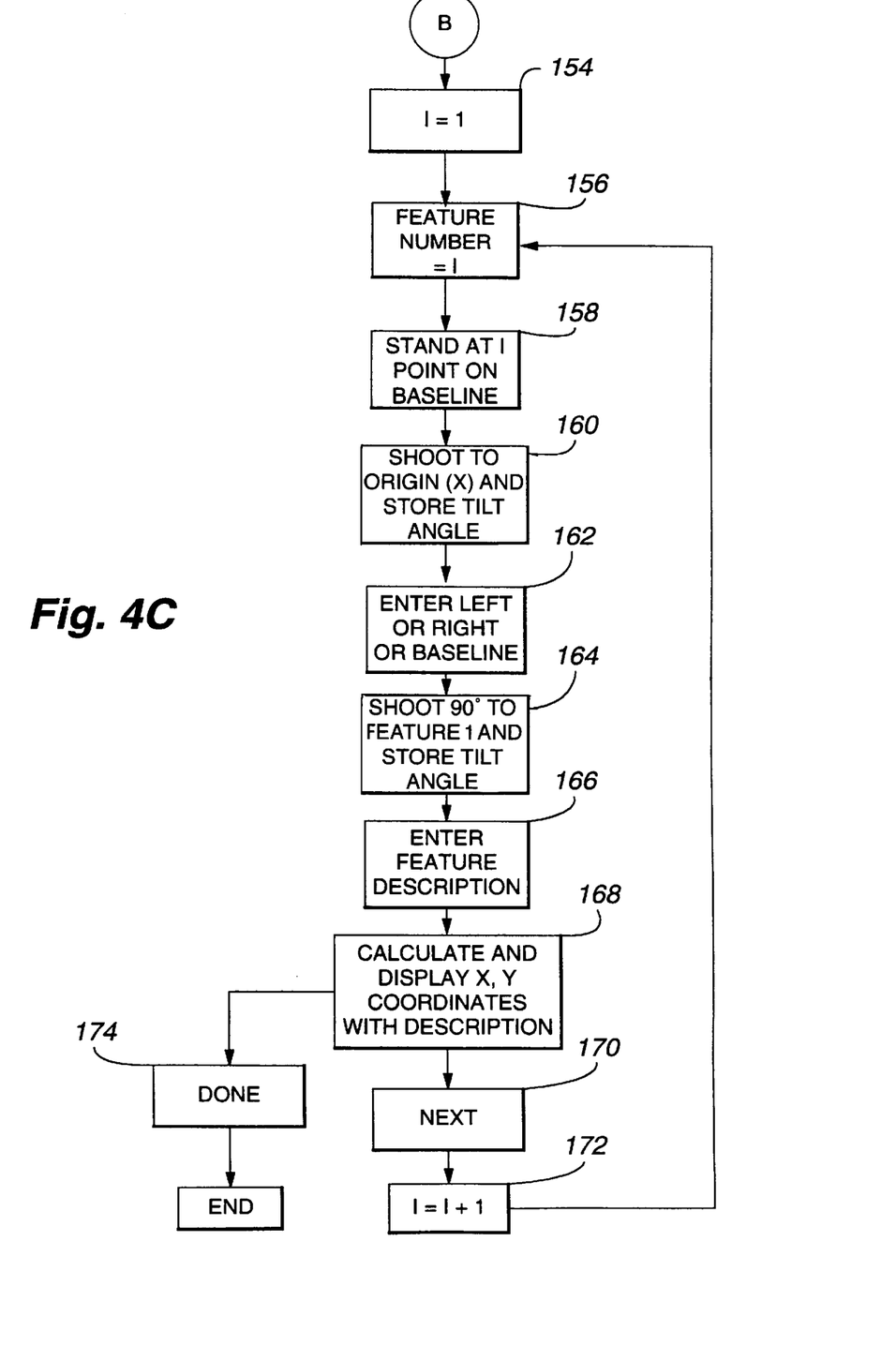

With reference additionally now to FIGS. 4A–4C, a logic flow for effectuating the baseline position method 50 of FIG. 2 and the range/triangulation method 100 of FIG. 3 is shown when utilizing the system 10. The process 110 begins at step 112 where a file associated with the particular scene is created on the data recorder 14. The user of the system 10 is then prompted by the display 36 of the data recorder 14 to enter a name for the file created at step 114 to enable the later retrieval of the file by name. The name for the file is entered via the keypad 34 of the system 10. The display 36 of the data recorder 14 then prompts the user of the system 10 to select the mapping method to be utilized at the scene at step 116. Should the baseline position method 50 be selected, at step 118 the user is then prompted to enter the origin x,y,z coordinates (generally 0,0,0) at step 120 to begin the baseline/offset method for determining the relative position of various features and objects.

Alternatively, should the user select the range/triangulation method 100, at step 122 the user is then prompted to enter the value of the x coordinate of the first control point at step 124 and the y value and the z value of the first control point at step 126. These may generally be entered as "0,0,0". The user is then prompted to enter the x value of the second control point at step 128 and the y value of the second control point at step 130 and then the z component at step 131. Where "0,0,0" has been chosen as the coordinates of the first control point, the x coordinate of the second control point will also be "0" and the y coordinate will be the linear horizontal distance between the two control points as determined as described herein or otherwise known. This distance may be determined by positioning the system 10 at the first control point and shooting to the second control point or vice versa. The z component will be vertical distance between the control points.

In the event the range/triangulation method 100 (FIG. 3) has been selected, the process 110 then proceeds to step 132 as shown in FIG. 4B, wherein the user of the system 10 positions himself at the first feature or object of interest at the scene. From this position, the user aims the device 12 of the system 10 toward the first control point at step 134 to determine the direct distance and tilt angle from the feature to that first control point. The display 36 of the data recorder 14 then prompts the user to enter an indication of whether the feature is to the left or right of the axis determined between the first and second control points at step 136. In order to determine the direct distance from the particular feature to the second control point, the user at step 138 will aim the system 10 from the feature to the second control point (or from the second control point to the feature) to determine that distance and elevation. In the event that more than a single pair of control points has been selected, the same procedure would be followed with respect to the new control points.

After having determined the distances between the desired feature and the first and second control points, the display 36 of the data recorder 14 (FIG. 1) prompts the user of the system 10 at step 140 to enter a feature descriptor representative of the particular feature associated with those distance values. The data recorder 14 may be programmed to facilitate the entry of the feature descriptor by providing a menu of complete or abbreviated feature descriptors which may then be selected by the user of the system 10 as an alternative to manually entering the individual characters comprising the descriptor.

At step 142, the computational capability of the data recorder 14 then calculates the horizontal x,y, coordinates and relative elevation z of the selected feature based upon its distance to the first and second control points and the corresponding tilt angles, which control points have been previously determined to be a known distance apart and having known coordinate positions. These horizontal x,y coordinates and elevation z are then displayed on the display 36 of the data recorder 14 in conjunction with the feature descriptor selected or entered by the user of the system 10. Since it is often necessary that the relative position of a number of features and objects at a scene be determined, the process 110 then proceeds to step 144 to allow entry of the distances to the pair of control points of another feature at the scene. In this regard, at step 146, the next feature is numbered by incrementing the preceding feature "I" with 1 to return to step 132 to again repeat steps 134–142 with respect to the next feature.

As previously described, in the event an additional control point is required to adequately determine the relative position of the various features and objects at a scene, at step 148 a new control point is selected and the point number of the new control point is determined at step 150 by measuring the distance and tilt angle to the additional control point (which is preferably a previously recorded point) from the first and second control points. In this event, the process 110 then also returns to step 132 to determine the position of various features or objects with respect to the first control point and the third or subsequent control point selected. Once the relative positions of all desired features and objects at the scene have been determined with respect to all selected control points, the process 110 proceeds to step 152 wherein the range/triangulation method has been completed.

With specific reference to FIG. 4C, the portion of the process 110 utilized for implementing the baseline position method 50 (FIG. 2) of the present invention is shown. This process begins by setting a variable "I" equal to 1 indicative of the first feature as to which the x,y,z coordinates are to be determined. At step 156, the feature number is set to the current value of the variable "I". Thereafter at step 158, the user of the system 10 positions himself at a point along the baseline established between the first and second control points directly perpendicular to the feature "I". The user then aims the system 10 at the origin or first control point at step 160 to determine the direct distance tilt angle and calculate the value "x" for the x,y coordinates of the feature "I" and the elevation z. The display 36 of the data recorder 14 then prompts the user to enter an indication of whether the feature "I" is to the left or right of the baseline determined between the first and second control points at step 162.

The user of the system 10 then aims it toward the feature "I" at 90E to the baseline extending between the first and second control points to determine the distance to the feature "I" from the baseline at step 164. This distance and tilt angle are then used by the system 10 to calculate the horizontal distance value of the "y" portion of the horizontal x,y coordinates directly if the coordinates of the first control point has been defined as "0,0,0". Display 36 of the data recorder 14 then allows the user to enter or select a feature descriptor for the feature "I" in the manner previously described at step 166.

The data recorder 14 then displays the horizontal x,y coordinates and elevation z derived from the distances and tilt angles measured and displays the same along with the selected or input feature descriptor at step 168. The same process is followed with respect to subsequent features or objects at step 170 and the value of the variable "I" is incremented by 1 prior to the process returning to step 156. Once all features and objects at the scene have been recorded as to their relative position to the baseline between the first and second control points, the process is completed at step 174.

With reference now to Table 1, a representative point list is shown which may be generated and displayed on the display 36 of the data recorder 14 or downloaded in an ASCII, DXF or other format to a computer 40 (FIG. 1) for subsequent storage and/or manipulation. As previously described, either the baseline position method 50 illustrated in FIG. 2 or the range/triangulation method 100 illustrated in FIG. 3 as described in more detail in FIGS. 4A–4C may be utilized to generate the point list of Table 1.

TABLE 1

| POINT LIST | | | | |
|---|---|---|---|---|
| Number | x (feet) | y (feet) | z (feet) | Note |
| 1 | 0.00 | 0.00 | 0.0 | $CP_1$ |
| 2 | 107.00 | 0.00 | 0.0 | $CP_2$ |
| 3 | 53.50 | −51.12 | −22.0 | $DFTIRE_1$ |
| 4 | 39.67 | −50.22 | −18.7 | $DRTIRE_1$ |
| 5 | 39.67 | −50.22 | −17.0 | $PRTIRE_1$ |
| 6 | 39.56 | −56.53 | 0.0 | DFVH2E |
| 7 | 40.49 | −67.83 | 0.0 | $DRVH_2$ |
| 8 | 45.37 | −68.31 | 0.0 | $PRVH_2$ |
| 9 | 46.73 | −88.41 | −2.0 | $SKVH_2$ START |
| 10 | 11.44 | −43.52 | −2.0 | $SKVD_1$ START |
| 11 | 10.06 | −54.07 | −1.5 | CURB ST. |
| 12 | 24.52 | −54.76 | −1.5 | CURB LN. |
| 13 | 35.55 | −62.61 | −1.5 | CURB LN. |
| 14 | 38.64 | −75.71 | −1.5 | CURB END |
| 15 | 66.96 | −71.56 | 1.2 | STOP SIGN |

In addition to the point list shown, the system 10 can further provide a direct, scaled print-out (or scale plot) of the points and their true relative positions in three dimensional representations. In this manner, a true plan view pictorial representation of the accident scene features may be quickly made by manually adding pictures of the surrounding features, vehicles and the like at the points indicated in the scale plot. Alternatively, and in conjunction with a computer graphics package, since the tilt angle and relative elevation of each distance measurement taken is known and stored, the scene may be also illustrated entirely by computer in conjunction with the scale plot and the accompanying feature descriptors in plan views, elevational views, and/or various perspective views.

While there have been described above, the principles of the present invention in conjunction with specific apparatus, it is to be clearly understood that the foregoing description is made only by way of example and not as a limitation to the scope of the invention. For example, although illustrated and described with respect to a laser based range finding instrument, any signal transmitting and receiving device useful for measuring distance may be utilized in conjunction with a data recorder in which distance information is entered directly from the ranging instrument or manually by the operator.

What is claimed is:

1. A hand held vehicle speed and object distance measuring apparatus comprising:

a hollow housing;

a signal transmitting and receiving device contained within said housing for transmitting and receiving a directed signal, said transmitted signal being directed toward each in a series of selected objects at a scene and receiving a reflected signal therefrom;

a user aiming sight thereon for directing said transmitted signal; and a tilt angle sensor in said housing sensing a tilt angle of said transmitted signal, said tilt angle sensor having a neutral horizontal position and producing an electrical signal proportional to an inclination angle of said transmitted signal from said neutral horizontal position, said device being capable of determining a direct object distance and a horizontal distance to each of said series of selected objects based upon a time of flight of said transmitted signals directed to each one of said series of selected objects and reflected signals received from said each one of said series of selected objects and their respective tilt angles.

2. The apparatus according to claim 1 further comprising a data recorder associated with said device having a display viewable by said user, said data recorder being coupled to said device to store data indicative of a plurality of said object distances to each of said selected objects from said distance measuring device and respective tilt angles, said data recorder displaying selected ones of said distances on said display and associating each of said object distances with a user selected identifier input to said data input section.

3. The apparatus according to claim 1 wherein said device is a laser based speed and distance measuring device.

4. The apparatus according to claim 2 wherein said data recorder is attached to said housing of said device.

5. The apparatus according to claim 2 wherein said signal transmitting and receiving device is a laser based speed and distance measuring device.

6. A hand held vehicle speed and object distance measuring apparatus comprising:

a housing;

a laser transmitting and receiving device contained within said housing for transmitting and receiving a directed light signal, said transmitted signal being directed toward each in a series of selected objects at a scene and receiving a reflected signal therefrom;

a user aiming sight coupled to said housing for directing said transmitted light signal;

a tilt angle sensor in said housing sensing a tilt angle of said transmitted signal, said tilt angle sensor having a neutral horizontal position and producing an electrical signal proportional to an inclination angle of said transmitted signal from said neutral horizontal position, said device being capable of determining a direct object distance and a horizontal distance to each of said series of selected objects based upon a time of flight of said transmitted signals directed to each one of said series of selected objects and reflected signals received from said each one of said series of selected objects and their respective tilt angles; and a data recorder coupled to said device having a display viewable by said user, said data recorder being coupled to said device to store data indicative of a plurality of said object distances to each of said selected objects from said distance measuring device and respective tilt angles, said data recorder being capable of calculating coordinates of at least one of said selected objects.

7. A hand held vehicle speed and object distance measuring apparatus comprising:

a housing;

a laser transmitting and receiving device contained within said housing for transmitting and receiving a directed light signal, said transmitted signal being directed toward each in a series of selected objects at a scene and receiving a reflected signal therefrom;

a user aiming sight coupled to said housing for directing said transmitted light signal;

a tilt angle sensor in said housing sensing a tilt angle of said transmitted signal, said device being capable of determining a direct object distance and a horizontal distance to each of said series of selected objects based upon a time of flight of said transmitted signals directed to each one of said series of selected objects and reflected signals received from said each one of said series of selected objects and their respective tilt angles; and a data recorder coupled to said device having a display viewable by said user, said data recorder being coupled to said device to store data indicative of a plurality of said object distances to each of said selected objects from said distance measuring device and respective tilt angles, said data recorder being capable of calculating coordinates of at least one of said selected objects;

wherein said tilt angle sensor is a damped fluid sensor having a neutral horizontal position, said sensor producing an electrical signal proportional to an inclination angle of said device from said neutral horizontal position.

8. The apparatus according to claim 7 wherein said data recorder displays direct distance, horizontal distance and tilt angle for each said object distance.

9. A method for determining first and second horizontal coordinates of a selected feature occupying at least one of a plurality of positions of a scene with respect to first and second control points fixed adjacent said scene, said method comprising the steps of:

initially determining a first horizontal distance between said first and second control points;

positioning a signal transmitting and receiving distance measuring device adjacent said selected feature at said at least one of said plurality of positions;

directing a first transmitted signal toward said first control point and sensing a tilt angle of said signal;

receiving a first reflected signal from said first control point at said distance measuring device;

secondly determining a second horizontal distance between said at least one of said plurality of positions and said first control point based on a time of flight of said first transmitted and first reflected signals and said tilt angle of said transmitted signal;

directing a second transmitted signal toward said second control point and sensing a tilt angle of said second transmitted signal;

receiving a second reflected signal from said second control point at said distance measuring device;

thirdly determining a third horizontal distance between said at least one of said plurality of positions and said second control point based on a time of flight of said second transmitted and second reflected signals and said tilt angle of said second transmitted signal; and calculating said first and second coordinates.

10. The method of claim 9 wherein said step of initially determining is carried out by the steps of:

additionally positioning said signal transmitting and receiving distance measuring device adjacent said first control point;

additionally directing a third transmitted signal toward said second control point;

additionally receiving a third reflected signal from said second control point at said distance measuring device; and additionally determining said first distance between said first and second control points based on a time of flight of said third transmitted and third reflected signals.

11. The method of claim 9 further comprising the step of:

computing an abscissa and ordinate of said feature with respect to a line through said first and second control points based upon said second and third distances and said tilt angles.

12. The method of claim 9 wherein said steps of directing, receiving, also directing and also receiving are carried out by means of a laser based ranging instrument.

13. The method of claim 12 wherein said steps of secondly and thirdly determining are carried out by means of a programmable field data collector.

14. The method of claim 13 wherein said first, second and third distances are electronically input to said field data collector by said laser based ranging instrument.

15. The method of claim 13 further comprising the step of:

manually entering a verbal descriptor associated with said selected feature to said field data collector.

16. The method of claim 9 wherein said steps of positioning, directing and also directing are prompted by a display associated with said signal transmitting and receiving distance measuring device.

17. The method of claim 16 wherein said first and second coordinates are automatically computed based upon said first, second and third distances and displayed on said display.

18. A method for determining first and second coordinates of a selected feature occupying at least one of a plurality of positions of a scene with respect to first and second control points fixed adjacent said scene, said method comprising the steps of:

initially determining a first horizontal distance between said first and second control points;

positioning a signal transmitting and receiving distance and tilt angle measuring device adjacent said first control point;

directing a first transmitted signal toward said selected feature at said at least one of said plurality of positions;

sensing a first tilt angle of said measuring device;

receiving a first reflected signal from said at least one of said plurality of positions at said distance measuring device;

secondly determining a second horizontal distance between said first control point and said at least one of said plurality of positions based on a time of flight of said first transmitted and first reflected signals and said first tilt angle;

repositioning said distance measuring device adjacent said second control point;

also directing a second transmitted signal toward said at least one of said plurality of positions;

sensing a second tilt angle of said measuring device;

also receiving a second reflected signal from said at least one of said plurality of positions at said distance measuring device;

thirdly determining a third horizontal distance between said second control point and said at least one of said plurality of positions based on a time of flight of said second transmitted and second reflected signals and said second tilt angle; and storing said first, second and third horizontal distances and said first and second tilt angles for subsequent calculation of said first and second coordinates.

19. The method of claim 18 wherein said step of initially determining is carried out by the steps of:

additionally positioning said signal transmitting and receiving distance measuring device adjacent said first control point;

additionally directing a third transmitted signal toward said second control point;

sensing a third tilt angle of said distance measuring device;

additionally receiving a third reflected signal from said second control point at said distance measuring device; and additionally determining said first horizontal distance between said first and second control points based on a time of flight of said third transmitted and third reflected signals and said third tilt angle.

20. The method of claim 18 further comprising the step of:

computing an abscissa and ordinate of said feature with respect to a line through said first and second control points based upon said second and third distances.

21. The method of claim 18 wherein said steps of directing, receiving, also directing and also receiving are carried out by means of a laser based ranging instrument.

22. The method of claim 21 wherein said steps of secondly and thirdly determining are carried out by means of a programmable field data collector.

23. The method of claim 22 wherein said first, second and third distances are electronically input to said field data collector by said laser based ranging instrument.

24. The method of claim 22 further comprising the step of:

manually entering a verbal descriptor associated with said selected feature to said field data collector.

25. The method of claim 18 wherein said steps of positioning, directing and also directing are prompted by a display associated with said signal transmitting and receiving distance and tilt angle measuring device.

26. The method of claim 25 wherein said first and second coordinates are automatically computed based upon said first, second and third distances and displayed on said display.

27. A method for determining first and second horizontal coordinates of a feature occupying at least one of a plurality of positions of a scene with respect to a baseline extending between first and second control points fixed adjacent said scene, said method comprising the steps of:

positioning a signal transmitting and receiving distance and tilt angle measuring device at said least one of a plurality of points along said baseline perpendicular to a specific one of said plurality of positions; directing a first transmitted signal toward said first control point and sensing a first tilt angle of said transmitted signal;

receiving a first reflected signal from said first control point at said distance measuring device;

determining a first horizontal distance between said at least one of said plurality of points along said baseline and said first control point based on a time of flight of said first transmitted and first reflected signals and said first tilt angle;

also directing a second transmitted signal toward said specific one of said plurality of positions and sensing a second tilt angle;

also receiving a second reflected signal from said specific one of said plurality of positions at said distance measuring device;

also determining a second horizontal distance between said at least one of said plurality of points and said specific one of said plurality of positions based on a time of flight of said second transmitted and second reflected signals and said second tilt angle; and storing said first and second horizontal distances for subsequent calculation of said first and second coordinates.

28. The method of claim 27 wherein said steps of directing, receiving, also directing and also receiving are carried out by means of a laser based ranging instrument.

29. The method of claim 28 wherein said steps of determining and also determining are carried out by means of a programmable field data collector.

30. The method of claim 29 wherein said first and second distances are electronically input to said field data collector by said laser based ranging instrument.

31. The method of claim 29 further comprising the step of:
manually entering a verbal descriptor associated with said selected feature to said field data collector.

32. The method of claim 27 wherein said steps of positioning, directing and also directing are prompted by a display associated with said signal transmitting and receiving distance measuring device.

33. The method of claim 32 wherein said first and second coordinates are automatically computed based upon said first and second horizontal distances and displayed on said display.

34. A system for recording relative positional data points of a scene comprising:
a signal transmitting and receiving distance measuring device having a tilt angle sensor therein having a neutral horizontal position, said tilt angle sensor producing an electrical signal proportional to an inclination of said device from said neutral horizontal position and a user aiming sight for directing a transmitted signal and sensing a tilt angle of said transmitted signal, said transmitted signal being directed toward each in a series of selected objects at said scene and receiving a reflected signal therefrom, said distance measuring device being capable of determining an object distance and a horizontal distance to each of said series of selected objects based upon a time of flight of said transmitted signals directed to each one of said series of selected objects and reflected signals received from said each one of said series of selected objects and their respective tilt angles; and a data recorder associated with said distance measuring device having a data input section for actuation by said user and a display viewable by said user, said data recorder being coupled to said distance measuring device to store data indicative of a plurality of said object distances to each of said selected objects from said distance measuring device and respective tilt angles, said data recorder displaying selected ones of said distances on said display and associating each of said object distances with a user selected identifier input to said data input section.

35. The system of claim 34 wherein said data recorder is programmable to determine an abscissa and ordinate of each of said series of selected objects based upon said object distances.

36. The system of claim 35 wherein said abscissa and ordinate are calculated relative to horizontal distances of each of said series of selected objects to first and second control points.

37. The system of claim 36 wherein coordinates of said first and second control points have been entered by said user on said data input section of said data recorder.

38. The system of claim 34 wherein said distance measuring device is electronically coupled to said data recorder by a data bus.

39. The system of claim 38 wherein said data indicative of said plurality of said object distances is input to said data recorder over said data bus.

40. The system of claim 34 wherein said data indicative of said plurality of said object distances is input to said data recorder through said data input section.

41. A system for recording relative positional data points of a scene comprising:
a signal transmitting and receiving distance measuring device having a tilt angle sensor and a user aiming sight for directing a transmitted signal and sensing a tilt angle of said transmitted signal, said transmitted signal being directed toward each in a series of selected objects at said scene and receiving a reflected signal therefrom, said distance measuring device being capable of determining an object distance and a horizontal distance to each of said series of selected objects based upon a time of flight of said transmitted signals directed to each one of said series of selected objects and reflected signals received from said each one of said series of selected objects and their respective tilt angles; and a data recorder associated with said distance measuring device having a data input section for actuation by said user and a display viewable by said user, wherein said data recorder is programmable to determine an abscissa and ordinate of each of said series of selected objects based upon said object distances, said data recorder being coupled to said distance measuring device to store data indicative of a plurality of said object distances to each of said selected objects from said distance measuring device and respective tilt angles, said data recorder displaying selected ones of said distances on said display and associating each of said object distances with a user selected identifier input to said data input section wherein said abscissa and ordinate are determined relative to a position on a baseline between first and second control points defining said abscissa and a corresponding perpendicular distance to each of said series of selected objects defining said ordinate.

42. The system of claim 41 wherein coordinates of said first control point have been entered by said user on said data input section of said data recorder.

43. A system for recording three dimensional relative positional data points of a scene comprising:
a signal transmitting and receiving distance measuring device halving a tilt angle sensor and a user aiming sight for directing a transmitted signal and sensing a tilt angle of said transmitted signal, said tilt angle sensor having a neural horizontal position and producing an electrical signal proportional to an inclination angle of said transmitted signal from said neutral horizontal position, said transmitted signal being directed toward each in a series of selected objects at said scene and receiving a reflected signal therefrom, said distance measuring device being capable of determining an object distance to each of said series of selected objects based upon a time of flight of said transmitted signals directed to each one of said series of selected objects and reflected signals received from said each one of said series of selected objects and calculating horizontal and elevational components of said object distance using said transmitted signal's tilt angle; and a data recorder associated with said device having a data input section for actuation by said user and a display viewable by said user, said data recorder being coupled to said device to store data indicative of a plurality of said object distances to each of said selected objects from said distance measuring device and store data indicative of respective tilt angles and corresponding horizontal and elevational component distances of said object distances, said data recorder displaying selected ones of said distances on said display and associating each of said object distances with a user selected identifier input to said data input section.

44. A method for determining first and second horizontal coordinates and an elevation of a selected feature occupying at least one of a plurality of positions of a scene with respect to first and second control points fixed adjacent said scene, said method comprising the steps of:

initially determining a first horizontal distance between said first and second control points;

positioning a signal transmitting and receiving distance measuring device adjacent said selected feature at said at least one of said plurality of positions;

directing a first transmitted signal toward said first control point and sensing a tilt angle of said signal;

receiving a first reflected signal from said first control point at said distance measuring device;

secondly determining a second horizontal distance between said at least one of said plurality of positions and said first control point based on a time of flight of said first transmitted and first reflected signals and said tilt angle of said transmitted signal;

directing a second transmitted signal toward said second control point and sensing a tilt angle of said second transmitted signal;

receiving a second reflected signal from said second control point at said distance measuring device;

thirdly determining a third horizontal distance between said at least one of said plurality of positions and said second control point based on a time of flight of said second transmitted and second reflected signals and said tilt angle of said second transmitted signal;

calculating said elevation of said feature from said first and second transmitted signals and said first and second tilt angles; and calculating said first and second coordinates.

45. The method of claim 44 wherein said step of initially determining is carried out by the steps of:

additionally positioning said signal transmitting and receiving distance measuring device adjacent said first control point;

additionally directing a third transmitted signal toward said second control point;

additionally receiving a third reflected signal from said second control point at said distance measuring device; and additionally determining said first distance between said first and second control points based on a time of flight of said third transmitted and third reflected signals.

46. The method of claim 44 further comprising the step of:

computing an abscissa and ordinate of said feature with respect to a line through said first and second control points based upon said second and third distances and said tilt angles.

47. The method of claim 44 wherein said steps of directing, receiving, also directing and also receiving are carried out by means of a laser based ranging instrument.

48. The method of claim 47 wherein said steps of secondly and thirdly determining are carried out by means of a programmable field data collector.

49. The method of claim 48 wherein said first, second and third distances are electronically input to said field data collector by said laser based ranging instrument.

50. The method of claim 48 further comprising the step of:

manually entering a verbal descriptor associated with said selected feature to said field data collector.

51. The method of claim 44 wherein said steps of positioning, directing and also directing are prompted by a display associated with said signal transmitting and receiving distance measuring device.

52. The method of claim 51 wherein said first and second coordinates and elevation are automatically computed based upon said first, second and third distances and displayed on said display.

* * * * *